United States Patent
Ganesh et al.

(10) Patent No.: US 6,725,346 B1
(45) Date of Patent: Apr. 20, 2004

(54) METHOD AND APPARATUS FOR OVERLAYING MEMORY IN A DATA PROCESSING SYSTEM

(75) Inventors: Guruswamy Ganesh, Austin, TX (US); Surendra P. Bhattarai, Austin, TX (US); Wallace B. Harwood, III, Austin, TX (US); Gary L. Miller, Austin, TX (US); Joseph Jelemensky, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/542,747

(22) Filed: Apr. 4, 2000

(51) Int. Cl.[7] .......................... G06F 12/00; G06F 12/14
(52) U.S. Cl. ........................ 711/163; 711/104
(58) Field of Search ................ 711/101, 102, 711/103, 104, 163, 154, 156

(56) References Cited

U.S. PATENT DOCUMENTS

| | | | | |
|---|---|---|---|---|
| 4,141,068 A | * | 2/1979 | Mager et al. | 711/103 |
| 5,187,792 A | | 2/1993 | Dayan et al. | |
| 5,603,011 A | | 2/1997 | Piazza | |
| 5,713,006 A | * | 1/1998 | Shigeeda | 710/8 |
| 5,793,943 A | * | 8/1998 | Noll | 714/11 |
| 5,974,402 A | * | 10/1999 | Lee et al. | 705/401 |

FOREIGN PATENT DOCUMENTS

| | | |
|---|---|---|
| EP | 834812 A | 2/1993 |
| JP | 58112149 | 4/1983 |

OTHER PUBLICATIONS

Gary Miller et al., "The Evolution of Powertrain Microcontrollers and Its Impact On Development Processes and Tools", 1997 Society of Automotive Engineers, Inc., pp. 1–13.
PCT International Search Report (3 pgs.).

* cited by examiner

*Primary Examiner*—Matthew Kim
*Assistant Examiner*—Matthew D. Anderson
(74) *Attorney, Agent, or Firm*—Joanna G. Chiu

(57) ABSTRACT

A data processing system includes an embedded controller (100) having a core (102), a system bus, nonvolatile memory (104), and random access memory (RAM) (106). The RAM (104) has a non-overlay region (108) and an overlay region (110). The overlay region (110) may be divided into a plurality of partitions. Partitions of the overlay region (110) may be used as general purpose memory when they are not being used as overlay regions.

29 Claims, 3 Drawing Sheets

METHOD AND APPARATUS FOR OVERLAYING MEMORY IN A DATA PROCESSING SYSTEM

FIELD OF THE INVENTION

The present invention relates to data processing systems. In particular, the present invention relates to data processing systems in which data can be overlaid from one memory onto another memory.

RELATED ART

Prior art embedded controllers support various memories, including memories on and off the chip. For example, some embedded controllers have a FLASH memory block as well as an SRAM memory block. Sometimes it is desired to change data in the FLASH memory during normal operation of the embedded controller. For example, for an embedded controller used as a controller for an engine (or other electromechanical device), various parameters, which are stored in the FLASH memory, may need to be changed in order to properly tune the engine. Since FLASH memory may not be readily programmed during normal operation of the embedded controller, prior art embedded controllers use an overlay scheme to overlay data from the SRAM memory block onto the FLASH memory.

Prior art overlay schemes have various problems. One problem relates to data transfer time. Data transfer time is defined as the elapsed time between when the bus master requests data and when the data is available and all access terminating signals are received. It is critical to maintain the same data transfer time when accessing the FLASH memory or the overlaid FLASH region. Prior art overlay schemes may not maintain this same data transfer rate for on-chip or off-chip FLASH memory. As a result, the embedded controller may not operate in the same way for data placed in the overlay as compared to when the same data is placed in the FLASH memory.

Another problem is that the overlay schemes used in the prior art can only overlay entire memory blocks. In other words, if the embedded controller has 512 Byte SRAM memory modules used by the overlay scheme, the entire 512 Bytes of any one module must be overlaid. It would be desirable to selectively overlay portions of the memory modules, as opposed to overlaying the entire module. It would also be desirable to select the size of the overlay portions.

Another problem with prior art overlay schemes is that in order to have multiple overlay blocks, multiple memory modules are needed, each with its own separate bus interface unit (BIU). Having multiple BIUs requires separate circuitry for each BIU which takes up space on a chip.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Figure 1:
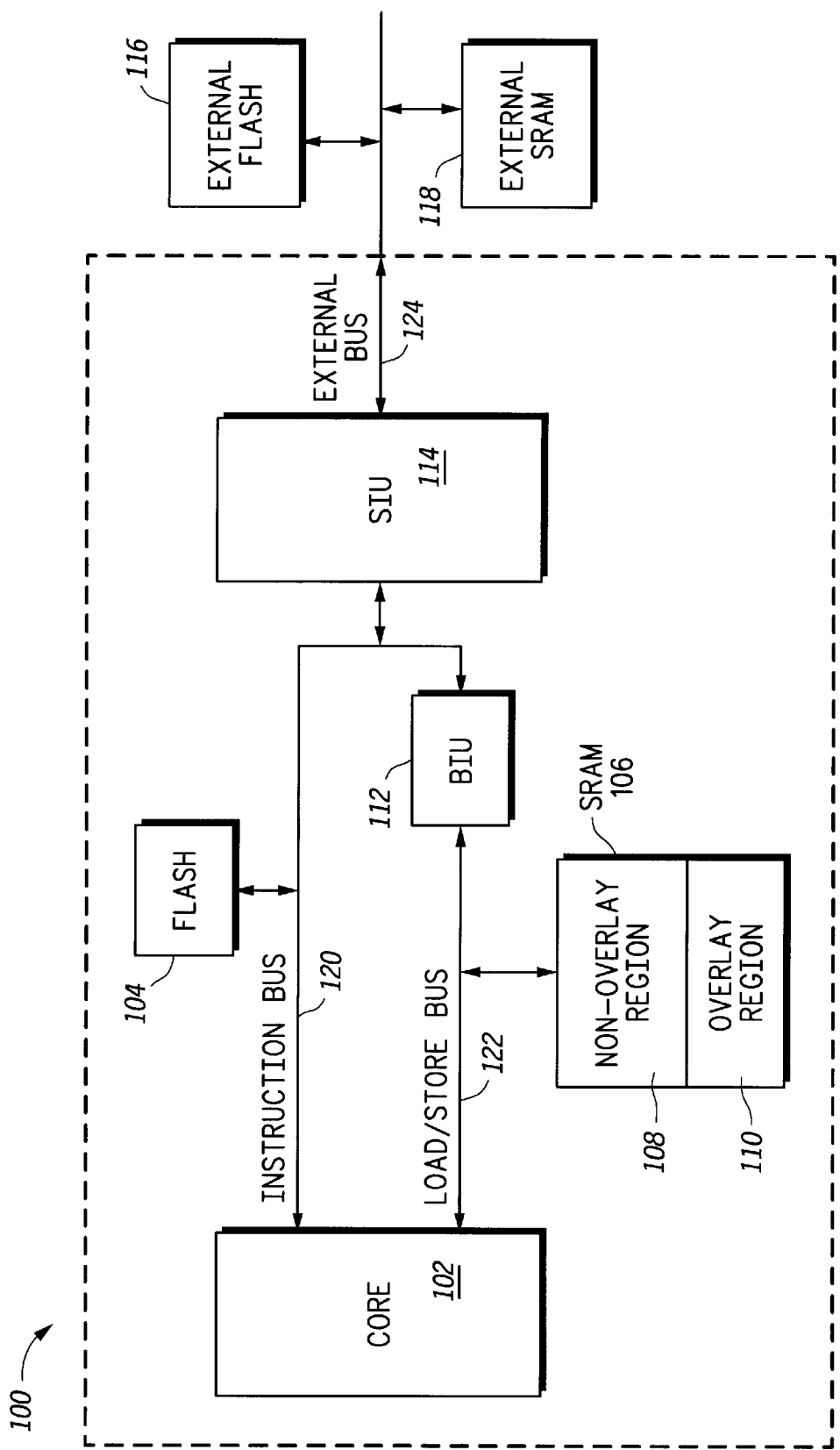
FIG. 1 is a block diagram of an embedded controller according to one embodiment of the present invention.

FIG. 1 is a block diagram of an embedded controller 100. The embedded controller 100 includes a core 102 which acts as the central processing unit for the controller 100. The core 102 is coupled to an instruction bus 120 and a load/store bus 122. This type of architecture is known as "Harvard Architecture". It should be understood that other architectures can also be used with the present invention. For example, a single system bus can be used in place of the two buses 120 and 122. The instruction bus 120 is used to fetch instructions, while the load/store bus 122 is used to fetch data. A system interface unit (SIU) 114 is coupled to the instruction bus 120 and to an external bus 124. The SIU 114 provides an interface for components or devices external to the embedded controller 100.

The embedded controller 100 includes nonvolatile memory. The nonvolatile memory may be FLASH, ROM, EEPROM, EPROM, or any other suitable type of memory. In a preferred embodiment, FLASH memory is used. In FIG. 1, FLASH memory 104 is coupled to the instruction bus 120. In addition, external FLASH memory 116 may be included and coupled to the external bus 124. The embedded controller 100 also includes volatile memory. While the volatile memory may be comprised of any type of random access memory (RAM), such as static random access memory (SRAM) or dynamic random access memory (DRAM), a preferred embodiment is implemented using an SRAM module. However, any appropriate number and type of RAM modules may be used. In FIG. 1, SRAM 106 is coupled to the load/store bus 122. The SRAM 106 includes a non-overlay region 108 and an overlay region 110 (described below). In addition, external SRAM 118 may be included and coupled to the external bus 124. Coupled between the instruction bus 120 and the load/store bus 122 is a bus interface unit (BIU) 112. The function of the BIU 112 is to provide an interface between the instruction bus 120 and the load/store bus 122. In an alternate embodiment, the BIU may be a part of the nonvolatile memory.

As mentioned above, it is sometimes desired to change parameters or data in the FLASH memory 104 during the normal operation of the embedded controller 100. However, FLASH memory may not be readily programmed during the normal operation of the embedded controller 100. Therefore, the SRAM memory 106 must be overlaid onto the FLASH memory 104, since parameters in the SRAM 106 can be changed easily.

Embodiments of the present invention provide an improved overlay scheme. As mentioned above, the SRAM 106 includes a non-overlay region 108 and an overlay region 110. In one embodiment, the SRAM 106 is 32 KBytes, with the non-overlay region 108 taking up 28 KBytes and the overlay region 110 taking up 4 KBytes. Of course, the SRAM 106 may be any suitable size and partitioned in any desirable manner. The overlay region 110 can be used for either general purpose RAM or for overlay. The non-overlay region 108 can be used for general purpose RAM. In an alternate embodiment, the entire SRAM 106 can be designated as an overlay region. In other words, the SRAM 106 can be partitioned as shown in FIG. 1 or can be partitioned by the fact that some of the SRAM is used for overlay and some of the SRAM is not. Therefore, a single RAM module (such as SRAM or DRAM, for example) may be used for both overlay and general purpose functions.

Figure 2:
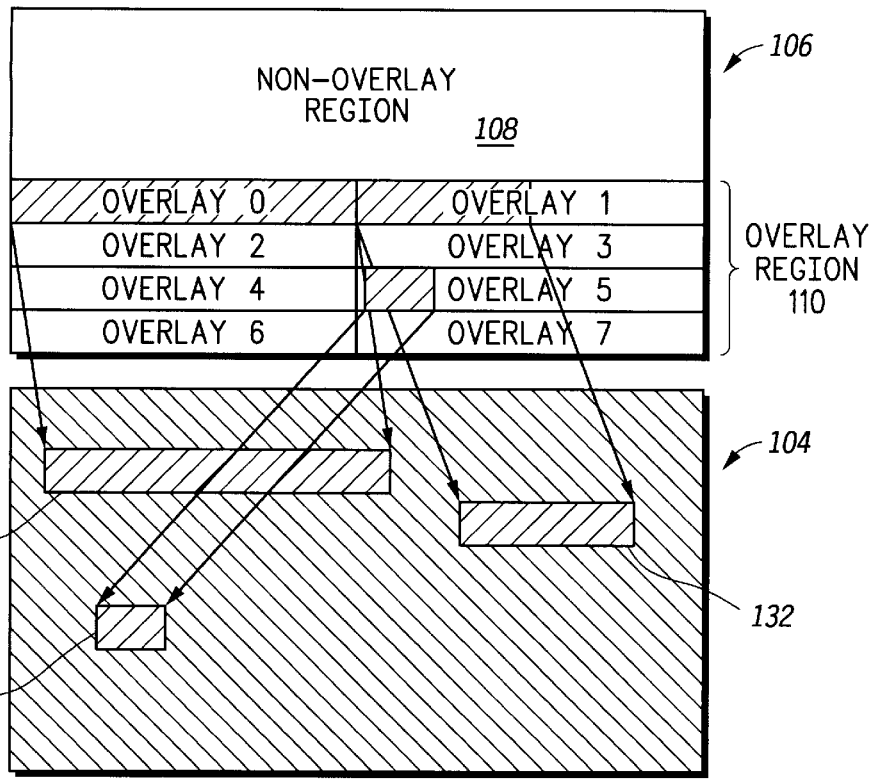
FIGS. 2 and 3 are block diagrams illustrating examples of overlaying of SRAM regions onto FLASH.
Figure 3:
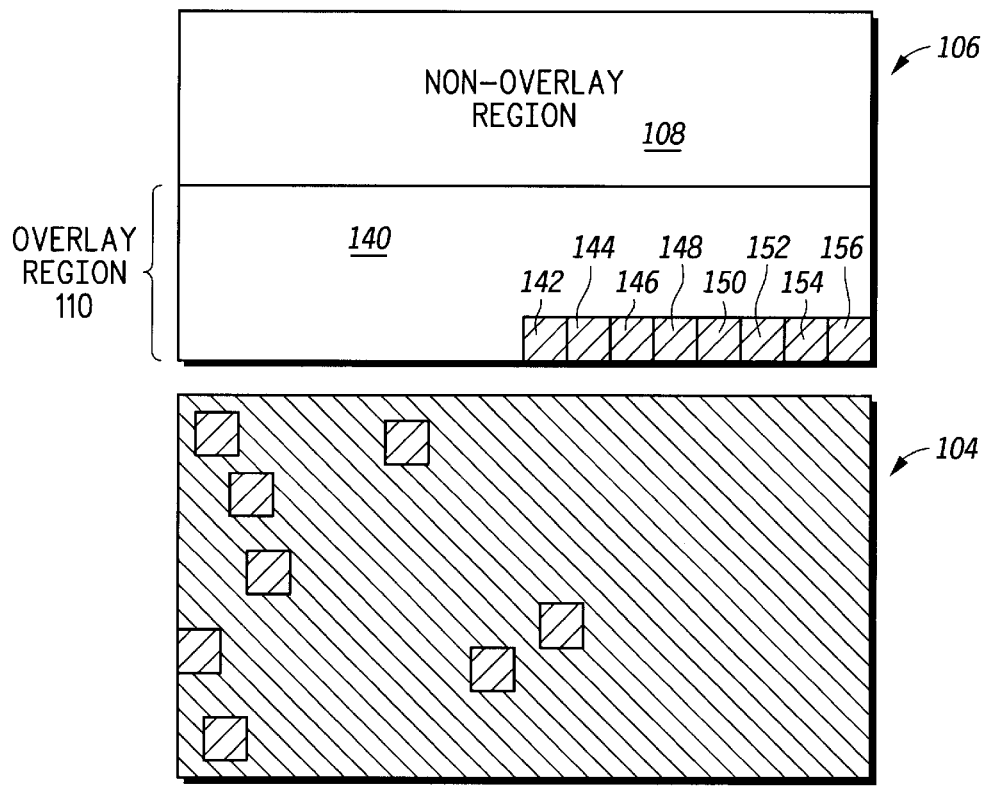

FIGS. 2 and 3 are block diagrams illustrating examples of overlaying of SRAM regions onto FLASH memory. FIG. 2 shows SRAM 106 and FLASH memory 104. The SRAM 106 is divided into a non-overlay region 108 and an overlay region 110. The overlay region 110 is sub-divided into eight separate regions or partitions (overlay 0, overlay 1, overlay 2, overlay 3, overlay 4, overlay 5, overlay 6, and overlay 7). In the example where the overlay region is 4 KBytes, each of the eight partitions is 512 Bytes. Alternate embodiments may include any number of partitions or different size partitions. The present embodiment illustrated in FIG. 2 allows any of the eight partitions to be used for overlay. In addition, for each partition used for overlay, the entire partition can be used, or only a portion can be used.

In one embodiment, the partitions are software programmable. For example, the SRAM 106 may include a control register having various fields capable of defining modes and partition characteristics corresponding to SRAM 106. The control register may include a mode field that is capable of configuring the RAM module into either an overlay mode or a non-overlay mode. In the non-overlay mode, the entire RAM module is used as a general purpose RAM, without overlay capabilities. In the overlay mode, overlay partitions may be created, as was described above. The control register may therefore also include an enable field capable of enabling each of the partitions. This way, even if the RAM is configured for overlay mode, each of the partitions may be enabled to overlay a portion of the FLASH or disabled to function as a general purpose RAM. The control register may further include a collapse field capable of collapsing the overlay partitions into a contiguous memory location. (This collapse field will be described further below, in reference to FIG. 3.) In order to configure the size of each overlay partition, the control register may also include a partition size field.

As was described above, the control register can be configured by software, thus allowing for flexibility in configuring the RAM module and its partitions. Furthermore, this control register may be found in the RAM module, such as SRAM 106, or in any other appropriate location that is accessible by software or hardware. Likewise, if other RAM modules are used in addition to SRAM 106, they can be similarly configured with a control register corresponding to each additional RAM module.

SRAM 106 may also include base address registers. In one embodiment, there are eight registers, each corresponding to one of the eight partitions illustrated in FIG. 2. Likewise, if there are more or less partitions, more or less base address registers may be used. Each base address register contains the base or starting address of the FLASH memory segments to be overlaid. The base address registers may also include a field to define the size of the FLASH segment to be overlaid. For example, four bits within each register can be used to indicate the size. Furthermore, in the collapsible mode mentioned above, the size of the FLASH segment can be forced to a certain size regardless of the value programmed in the size field. It should also be understood that the base address registers may be found in any appropriate location, such as another memory module.

In the example shown in FIG. 2, overlay 0 partition is used in its entirety (512 Bytes) to overlay segment 130 of the FLASH 104 where segment 130 is 512 Bytes. Overlay 1 partition is partially overlaid onto segment 132, which is 256 Bytes. Overlay 5 partition is partially overlaid onto segment 134, which is 128 Bytes. It can be seen that the partitions of the overlay region 110 can be selectively overlaid onto the FLASH memory 104. Also note that each partition, or each portion of a partition, which is not used for overlay, can be used for general purpose memory. In the example shown in FIG. 2, the partitions overlay 2, overlay 3, overlay 4, overlay 6, and overlay 7 may be used in their entirety for general purpose memory. Similarly, 256 Bytes of the overlay 1 partition and 384 Bytes of the overlay 5 partition may be use for general purpose memory. The remainder of the FLASH memory 104 will respond normally to FLASH accesses.

FIG. 3 is a block diagram illustrating an alternate way of overlaying memory using a collapsible mode. FIG. 3 shows SRAM 106 with a non-overlay region 108 and an overlay region 110. The overlay region 110 shown in FIG. 3 is capable of operating in a collapsible mode. This mode may be enabled by a collapse field found in a control register with the SRAM 106, as mentioned above. As shown, the overlay region includes eight partitions 142, 144, 146, 148, 150, 152, 154, and 156. In this example, each of the partitions 142, 144, 146, 148, 150, 152, 154, and 156 is 4 Bytes, for a total of 32 Bytes. Of course, the partitions could be larger or smaller than 4 Bytes. These partitions have been collapsed into a contiguous memory location which leaves more contiguous memory available for general non-overlay use. The portion of the overlay region 110 which is not used for overlay is referred to as region 140. In the present embodiment, the region 140 is contiguous with the non-overlay region 108. Each of the partitions 142, 144, 146, 148, 150, 152, 154, and 156 can be overlaid onto a segment in the FLASH memory 104.

In the embodiments of the memory overlay techniques described herein, the overlaid partition sizes are naturally aligned in the FLASH memory. Therefore, the size of the overlaid partition corresponds to the alignment of the FLASH memory. For example, if a 128 byte size portion is to be overlaid, it should be 128 byte aligned in the FLASH memory. Therefore, in the base address registers discussed above, the base address may not be naturally aligned. In this case, the least significant bits of the base address of the FLASH memory to be overlaid can be considered 0's in order to make the starting address naturally aligned.

Figure 4:
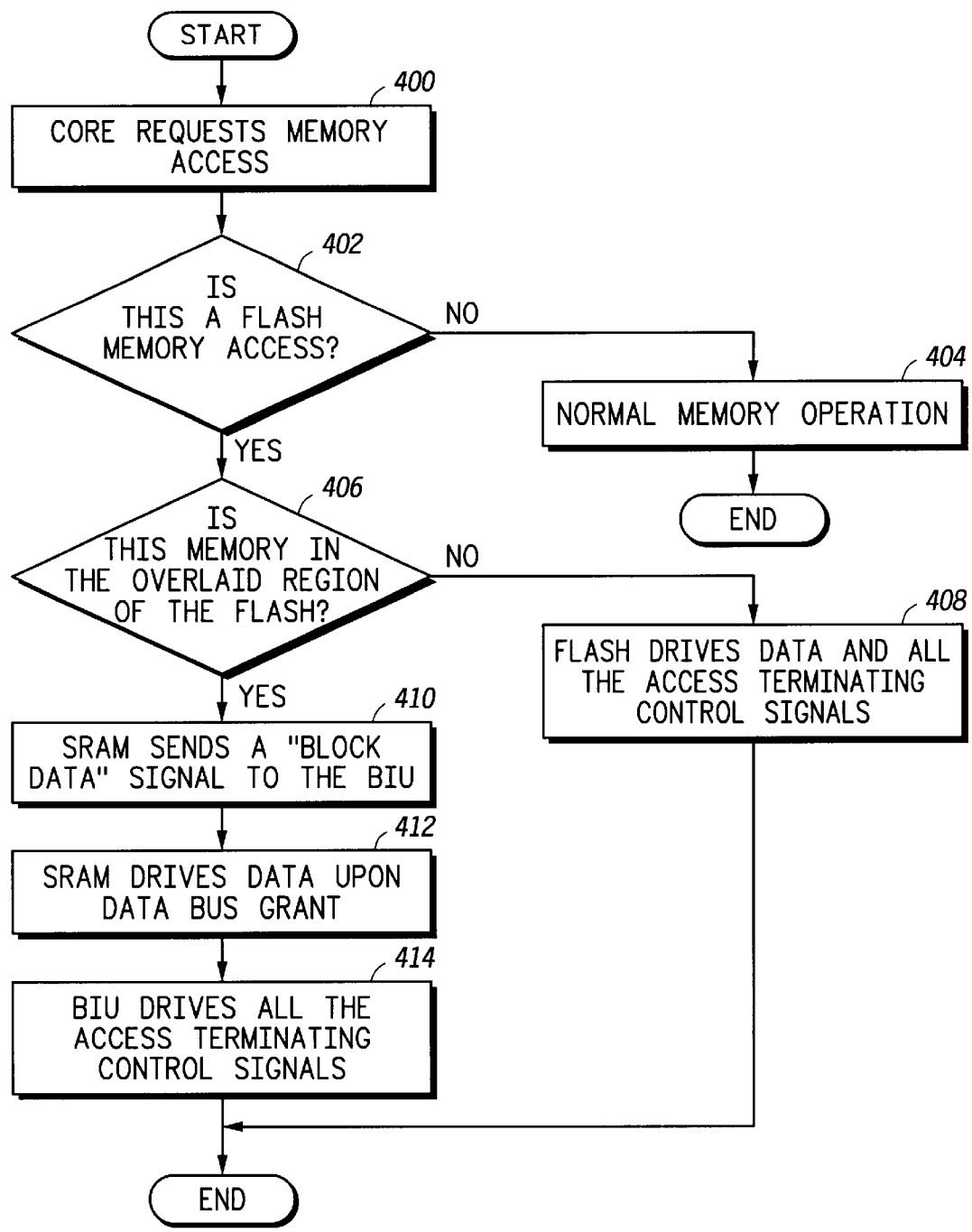
FIG. 4 is a flow diagram illustrating the operation of one embodiment of the present invention.

FIG. 4 illustrates, in flow diagram form, a description of the operation of one embodiment of the present invention. The purpose of FIG. 4 is to help illustrate how the present embodiment operates. However, other variations may be used to achieve similar results. During the normal operation of the embedded controller 100, a bus master will request a memory access (block 400). In this example, the bus master is the core 102. The request may be for any memory available including FLASH memory 104, SRAM 106, external FLASH memory 116, or external SRAM 118. Note that there may be other types of modules available that are not shown in the Figures. Decision diamond 402 of the flow diagram asks if the request is for a FLASH memory read access. If it is not a request for a FLASH memory read access, the normal memory operation continues (block 404). If it is a request for a FLASH memory read access, decision diamond 406 asks whether this memory is in the overlaid region of the FLASH memory. This decision is accomplished by the SRAM 106 snooping for FLASH memory addresses on the load/store bus 122. If it is not a request for an overlaid region access, the FLASH memory (via the BIU 112) drives the data and all the access terminating control signals (block 408) to the core 102 via the BIU 112. Note that in other architectures, such as those with a single system bus, data and terminating control signals may be driven directly to the requesting device or bus master without the use of a bus interface unit such as BIU 112.

If the requested memory is in the overlaid region, the SRAM sends a "block data" signal to the FLASH memory 104 via the BIU 112 (block 410). In other architectures, the "block data" signal may be sent directly to the nonvolatile memory, without the use of BIU 112. The purpose of sending this signal is to inhibit the FLASH memory 104 from driving data on the load/store bus 122. The SRAM then drives the data onto the load/store bus 122 upon a data bus grant. (block 412). Next, the FLASH memory 104, via the BIU 112, drives all the access terminating control signals, such as transfer acknowledge, data valid, etc. (block 414) to the bus master or requesting device. In this manner, the data is driven by the RAM module while the access terminating control signals are driven by the FLASH memory. This reduces the hardware requirements because each RAM module does not require its own bus interface unit capable of driving terminating control signals according to FLASH memory architecture. Furthermore, having the FLASH drive the access terminating control signals maintains the proper timing.

In one embodiment of the present invention, the RAM module (such as SRAM 106) may selectively allow a write from a bus master based on an identification or type of bus master. For example, the load/store bus 122 may contain a signal named "core access" such that when the core 102 initiates a transaction, this signal is asserted. When the overlay mode is enabled, if there is a write access to a portion of overlay region 110 programmed to be used to overlay a FLASH segment, then this access can either be allowed or disallowed, depending on the identification of the master requesting the write. In one embodiment, a write access initiated by the core ("core access" asserted) is not allowed while a write access initiated by a non-core device, such as a development tool, ("core access" negated) will be allowed. This prevents the core 102 from unintentionally corrupting the data slated to be used to overlay the FLASH segment. If the core actually intends to change the overlay data in overlay region 110, it can disable the overlay mode, change the data, and then reenable the overlay mode. Similarly, other methods or signals may be used to allow the RAM module to identify, the bus master before allowing a write request.

As described above, the SRAM module 106 may have a mode bit in the control register that either enables or disables the overlay mode. When the device 100 receives a reset signal, the SRAM 106 may either enable or disable the overlay feature by respectively setting or clearing this mode bit in the control register. The bit may be 1 (overlay enabled) or 0 (overlay disabled) based on reset configuration information. This reset configuration information can be provided by any non-volatile memory, such as an EEPROM, or it can be captured by sampling a device pin(s), at the negation of device reset. Also, upon receiving a reset signal, the contents of the base address registers (as discussed above) may remain unchanged. That is, the base address and size information may be maintained upon reset. Thus, alternate embodiments allow for improved flexibility through various options available upon a device reset.

Therefore, it can be appreciated how the memory overlaying techniques described herein are capable of using a single RAM module to perform both overlay and general purpose functions. Embodiments of the present invention also allow for improved flexibility through the use of software programmable partitions. Also, by allowing a RAM module to overlay portions of a nonvolatile memory, parameters normally stored in the nonvolatile memory may be tweaked and changed by a development tool during normal operation and prior to programming a final version of the nonvolatile memory with more precise parameters.

While the operation of the present invention was described as overlaying memory from the SRAM 106 onto the FLASH memory 104, other operations are possible. For example, the SRAM 106 can overlay memory onto the external FLASH 116 or the external SRAM 118. Note that in this example, the memory overlay maintains the proper data transfer time. Also note that any partition of overlay region 110 of SRAM 106 can be overlaid onto on-chip FLASH memory 104 or external FLASH memory 116. For example, partition overlay 0 (FIG. 2) can be overlaid onto on-chip FLASH memory 104 while partition overlay 1 can be overlaid onto external FLASH memory 116 simultaneously in the data processor. As mentioned above, other modules may also be used.

Embodiments of the present invention have been described with a SRAM 106, FLASH memory 104, external FLASH memory 116, and external SRAM 118. It should be understood that the embedded controller 100 may include multiple SRAMs 106, multiple FLASH memories 104, multiple external FLASH memories 116, and/or multiple external SRAMs 118. With multiple modules, the present invention operates in a similar manner as described above.

Furthermore, the same FLASH segment can be overlaid by multiple regions of the SRAM 106. A priority is assigned to each region in order to select the data from the highest priority region. In the embodiment shown in FIG. 2, overlay 0 has the highest priority, followed by overlay 1, overlay 2, etc. In the case where multiple RAM modules are used, modules are prioritized in a similar manner. That is, the RAM module with the highest priority having the overlay data inhibits the nonvolatile memory data and drives the overlay data to the requesting device.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. In a data processing system having a nonvolatile memory and a first random access memory (Ram) module having a non-overlay region for use as a general purpose Ram and an overlay region capable for use in overlaying portions of the nonvolatile memory, wherein the nonvolatile memory is coupled to the first Ram module via a system bus, a method comprising:

requesting a memory access to an overlaid portion of the nonvolatile memory;

sending a block data signal by the first Ram module to the nonvolatile memory to inhibit the nonvolatile memory from driving data onto the system bus;

the first Ram module driving data onto the system bus upon a data bus grant; and the nonvolatile memory driving access terminating control signals to complete the memory access.

2. The method of claim 1, wherein the first Ram module has a corresponding Ram data transfer time and the nonvolatile memory has a corresponding nonvolatile memory data transfer time, wherein the Ram data transfer time matches the nonvolatile data transfer time.

3. The method of claim 1, wherein requesting is performed by a bus master.

4. The method of claim 1, wherein the data processing system further comprises a bus interface unit coupled to the nonvolatile memory, wherein:
the block data signal is sent to the bus interface unit, and
the bus interlace unit drives the access terminating control signals.

5. The method of claim 4, wherein the nonvolatile memory includes the bus interface unit.

6. The method of claim 4, wherein the system bus comprises an instruction bus and a load/store bus, wherein the instruction bus is coupled to the load/store bus via the bus interface unit.

7. The method of claim 1, wherein the data processing system includes an embedded controller having the first Ram module and the system bus, and further comprises an external bus coupled to the system bus, wherein the nonvolatile memory is coupled to the external bus and the nonvolatile memory is external to the embedded controller.

8. The method of claim 1, wherein the nonvolatile memory is selected from a group consisting of a read only memory (ROM), a flash memory, an electrically erasable and programmable read only memory (EEPROM), and an electrically programmable read only memory (EPROM).

9. The method of claim 8, wherein the data processing system includes a plurality of nonvolatile memories, and the nonvolatile memory is one of the plurality of nonvolatile memories.

10. The method of claim 1, wherein the overlay region includes a prioritized plurality of overlay partitions.

11. The method of claim 1, wherein the data processing system includes a second RAM module having a non-overlay region and an overlay region, coupled to the system bus, capable of driving data onto the system bus upon the data bus grant, and having a priority with respect to the first RAM module to determine which one of the first and second RAM modules drives the data upon the data bus grant.

12. The method of claim 1, further comprising:
receiving a write request by the RAM module from a bus master; and
selectively allowing the write request based on an identification of the bus master.

13. The method of claim 12, wherein a core access signal is selectively asserted based on the identification of the bus master, and selectively allowing the write request is performed in response to the core access signal.

14. A random access memory (RAM) module, comprising:
a non-overlay region for use as a general purpose RAM;
an overlay region capable for use in overlaying portions of a nonvolatile memory, the overlay region including a software programmable first partition capable of being enabled and disabled, wherein:
if the first partition is enabled, the partition corresponds to a first overlaid portion of the nonvolatile memory; and
if the first partition is disabled, the first partition is available for use as a general purpose RAM; and
a block data signal capable of inhibiting the nonvolatile memory from driving data onto a system bus.

15. The RAM module of claim 14, wherein the overlay region is also capable for use as a general purpose RAM.

16. The RAM module of claim 14, wherein the first partition has a corresponding size configurable to overlay a corresponding size of the first overlaid portion of the nonvolatile memory.

17. The RAM module of claim 16, wherein the overlay region further includes a software programmable second partition, wherein:
the first and second partitions are prioritized with respect to each other;
the second partition is capable of being enabled and disabled, wherein if the second partition is enabled, the second partition corresponds to a second overlaid portion of the nonvolatile memory; and
the second partition has a corresponding size configurable to overlay a corresponding size of the second overlaid portion of the nonvolatile memory.

18. The RAM module of claim 17, capable of collapsing the first and second partitions into a contiguous memory location.

19. The RAM module of claim 18, wherein the corresponding size of the first partition is the same as the corresponding size of the second partition.

20. A data processing system comprising the RAM module of claim 14.

21. A random access memory (RAM) module, capable of operating in an overlay mode and a non-overlay mode, wherein:
in the overlay mode, the RAM module comprises:
a non-overlay region for use as a general purpose RAM;
an overlay region having a plurality of partitions, wherein a first portion of the plurality of partitions is enabled for use in overlaying portions of a nonvolatile memory and a second portion of the plurality of partitions is capable for use as a general, purpose RAM; and
in the non-overlay mode, the RAM module operates as a general purpose RAM.

22. A data processing system including the RAM module of claim 21.

23. The RAM module of claim 21, further comprising a data block signal capable of inhibiting the nonvolatile memory from driving data.

24. The RAM module of claim 23, further comprising a control register, wherein the control register includes:
a mode field capable of configuring the RAM module into one of the overlay mode and the non-overlay mode.

25. The RAM module of claim 24, wherein the control register further comprises:
a collapse field capable of collapsing the first portion of the plurality of partitions into a contiguous memory location;
a partition size field capable of configuring a partition size corresponding to each partition of the plurality of partitions; and
a partition enable field capable of enabling each partition of the plurality of partitions.

26. The RAM module of claim 24, further comprising a base address register, corresponding to one of the plurality of partitions enabled for use in overlaying portions of the nonvolatile memory, wherein the base address register stores a base address of the portion of the nonvolatile memory to be overlaid.

27. The RAM module of claim 26, wherein upon reset, the base address register maintains the base address.

28. The RAM module of claim 24, wherein upon reset, the RAM module will selectively set the mode field to configure the RAM module into the overlay mode.

29. The RAM module of claim 28, wherein selectively setting the mode field is performed in response to reset configuration information indicated by one of information stored in a memory or information detected at a device pin.

* * * * *

UNITED STATES PATENT AND TRADEMARK OFFICE
CERTIFICATE OF CORRECTION

PATENT NO.         : 6,725,346 B1
APPLICATION NO.    : 09/542747
DATED              : April 4, 2000
INVENTOR(S)        : Guruswamy Ganesh et al.

It is certified that error appears in the above-identified patent and that said Letters Patent is hereby corrected as shown below:

In Column 6, Line 55, Claim No. 1:
 Change "(Ram)" to --(RAM)--.

In Column 6, Line 57, Claim No. 1:
 Change "Ram" to --RAM--.

In Column 6, Line 59, Claim No. 1:
 Change "Ram" to --RAM--.

In Column 6, Line 63, Claim No. 1:
 Change "Ram" to --RAM--.

In Column 6, Line 66, Claim No. 1:
 Change "Ram" to --RAM--.

In Column 7, Line 3, Claim No. 2:
 Change "Ram" to --RAM--.

In Column 7, Line 4, Claim No. 2:
 Change "Ram" to --RAM--.

In Column 7, Line 6, Claim No. 2:
 Change "Ram" to --RAM--.

In Column 7, Line 14, Claim No. 4:
 Change "interlace" to --interface--.

In Column 7, Line 24, Claim No. 7:
 Change "Ram" to --RAM--.

Signed and Sealed this
First Day of February, 2011

David J. Kappos
*Director of the United States Patent and Trademark Office*

CERTIFICATE OF CORRECTION (continued)
U.S. Pat. No. 6,725,346 B1

In Column 7, Line 30, Claim No. 8:
    Change "flash" to --FLASH--.

In Column 8, Line 40, Claim No. 21:
    Change "general, purpose" to --general purpose--.